US011134350B2

United States Patent
El-Hoiydi et al.

(10) Patent No.: US 11,134,350 B2
(45) Date of Patent: Sep. 28, 2021

(54) DUAL WIRELESS AUDIO STREAMS TRANSMISSION ALLOWING FOR SPATIAL DIVERSITY OR OWN VOICE PICKUP (OVPU)

(71) Applicant: Sonova AG, Stafa (CH)

(72) Inventors: Amre El-Hoiydi, Neuchatel (CH); Evert Dijkstra, Neuchatel (CH); Hilmar Meier, Zurich (CH); Sebastian Stenzel, Stafa (CH); Timothee Jost, Auvernier (CH)

(73) Assignee: SONOVA AG, Stäfa (CH)

( * ) Notice: Subject to any disclaimer, the term of this patent is extended or adjusted under 35 U.S.C. 154(b) by 0 days.

(21) Appl. No.: 16/739,531

(22) Filed: Jan. 10, 2020

(65) Prior Publication Data

US 2021/0219065 A1    Jul. 15, 2021

(51) Int. Cl.
*H04B 7/04* (2017.01)
*H04R 25/00* (2006.01)
*H04B 7/0408* (2017.01)

(52) U.S. Cl.
CPC ......... *H04R 25/505* (2013.01); *H04B 7/0408* (2013.01); *H04R 25/554* (2013.01); *H04R 2225/43* (2013.01); *H04R 2225/55* (2013.01)

(58) Field of Classification Search
CPC .......................... H04R 2225/55; H04R 25/552; H04R 25/554; H04R 25/505; H04R 2525/43
USPC .................................. 375/267, 299, 347, 349
See application file for complete search history.

(56) References Cited

U.S. PATENT DOCUMENTS

| 5,511,128 | A | 4/1996 | Lindemann |
| 5,651,071 | A | 7/1997 | Lindemann |
| 6,847,627 | B1* | 1/2005 | Knutson ............. H04B 7/2656 370/337 |
| 8,526,648 | B2 | 9/2013 | Dijkstra |
| 9,247,355 | B2 | 1/2016 | El-Hoiydi |
| 9,532,131 | B2* | 12/2016 | Dusan ................. H04R 1/1083 |
| 9,544,699 | B2 | 1/2017 | Haubrich |
| 9,825,688 | B2* | 11/2017 | Chen ................... H04B 7/0834 |

(Continued)

FOREIGN PATENT DOCUMENTS

| DE | 43 27 901 C1 | 2/1995 |
| EP | 0 855 130 B1 | 7/1998 |

(Continued)

OTHER PUBLICATIONS

European Search Report for corresponding European application No. 20214634.6 dated Jun. 2, 2021.

*Primary Examiner* — Emmanuel Bayard
(74) *Attorney, Agent, or Firm* — Pearne & Gordon LLP

(57) ABSTRACT

Provided is an audio transmission method between at least two audio communication systems including a transmitting audio communication system with first and second audio transmitting devices and a receiving audio communication system with at least one audio receiving device. The method includes transmitting a first wireless audio stream, via a first wireless audio link, by the first audio transmitting device and a second wireless audio stream, via a second wireless audio link, by the second audio transmitting device; and selecting, by the at least one audio receiving device, one of the first wireless audio stream or the second wireless audio stream based on quality parameters of the first audio link and the second wireless audio link.

23 Claims, 8 Drawing Sheets

(56) References Cited

U.S. PATENT DOCUMENTS

| | | | |
|---|---|---|---|
| 10,284,971 B2 | 5/2019 | Secall et al. | |
| 10,341,758 B1* | 7/2019 | Tong | H04R 1/1016 |
| 10,448,232 B2* | 10/2019 | Sung | H04R 1/1091 |
| 2007/0173200 A1* | 7/2007 | Estrada | H04B 17/318 |
| | | | 455/67.11 |
| 2011/0268020 A1* | 11/2011 | Singamneni | H04W 72/082 |
| | | | 370/328 |
| 2012/0058727 A1* | 3/2012 | Cook | H04R 3/00 |
| | | | 455/41.3 |
| 2015/0326984 A1 | 11/2015 | Haubrich | |
| 2015/0334493 A1* | 11/2015 | Burns | H04R 25/552 |
| | | | 381/23.1 |
| 2016/0037270 A1* | 2/2016 | Polinske | H04R 25/558 |
| | | | 381/315 |
| 2016/0360326 A1 | 12/2016 | Bergmann et al. | |
| 2017/0311092 A1* | 10/2017 | Secall | H04R 25/505 |
| 2017/0325016 A1* | 11/2017 | Lee | H04R 1/1041 |
| 2018/0084456 A1* | 3/2018 | Gostev | H04W 84/18 |
| 2018/0084606 A1* | 3/2018 | Li | H04W 72/085 |
| 2018/0197559 A1* | 7/2018 | Orescanin | G10L 21/0232 |
| 2019/0007153 A1* | 1/2019 | Linsky | H04L 47/10 |
| 2019/0044576 A1 | 2/2019 | Thoen | |
| 2019/0110135 A1 | 4/2019 | Jensen et al. | |
| 2019/0141459 A1* | 5/2019 | El-Hoiydi | H04R 25/554 |
| 2019/0166423 A1 | 5/2019 | Anderson | |
| 2019/0268682 A1* | 8/2019 | Li | H04R 1/1016 |
| 2020/0067565 A1* | 2/2020 | Yu | H04B 1/71632 |
| 2020/0382569 A1* | 12/2020 | Fornshell | H04M 1/72412 |
| 2020/0382950 A1* | 12/2020 | Fornshell | H04W 12/61 |

FOREIGN PATENT DOCUMENTS

| | | |
|---|---|---|
| EP | 1 017 253 B1 | 7/2000 |
| WO | 2008/089784 A1 | 7/2008 |

\* cited by examiner

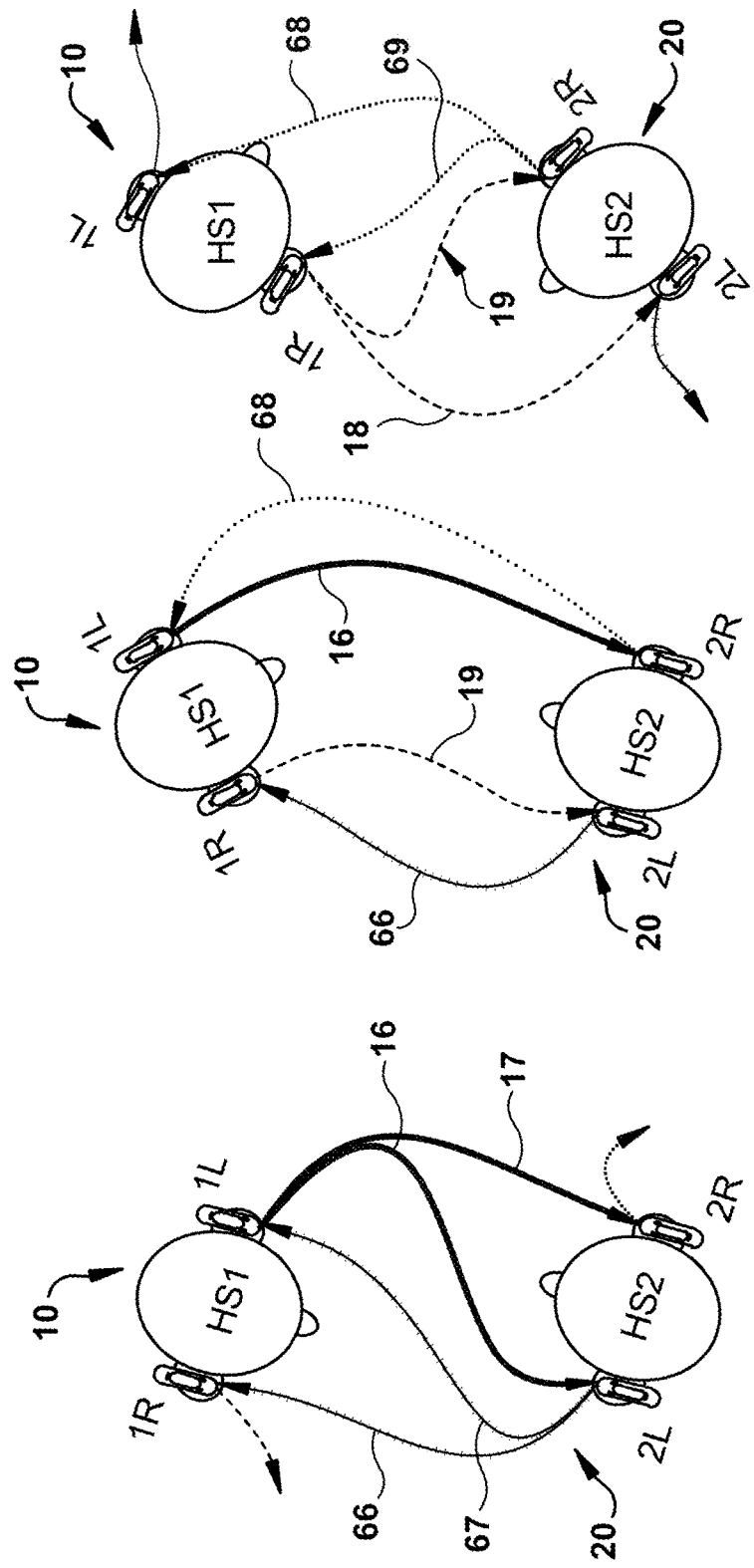

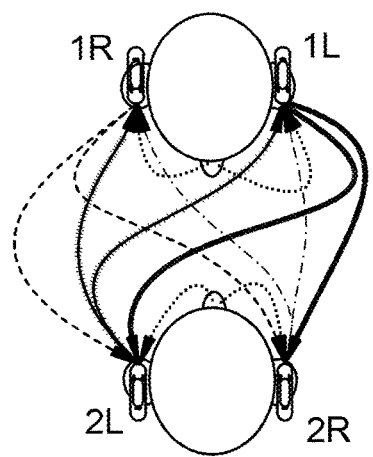
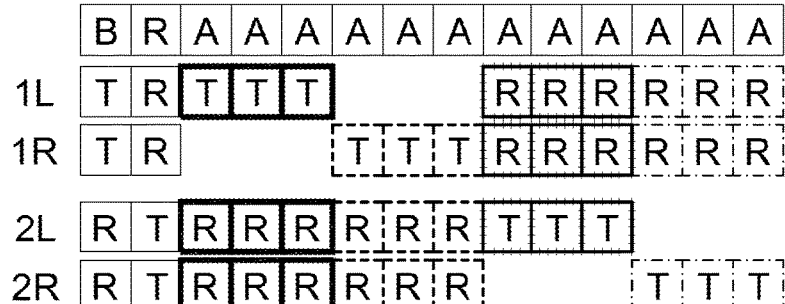
FIG. 10
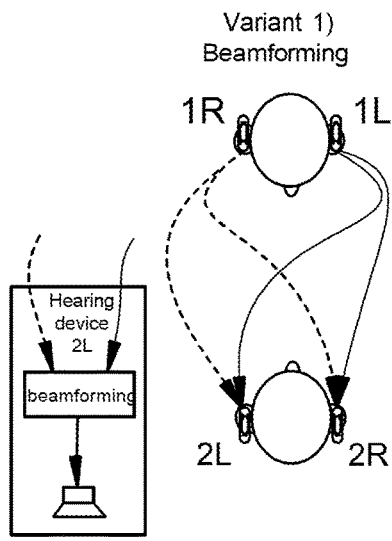
FIG. 11A
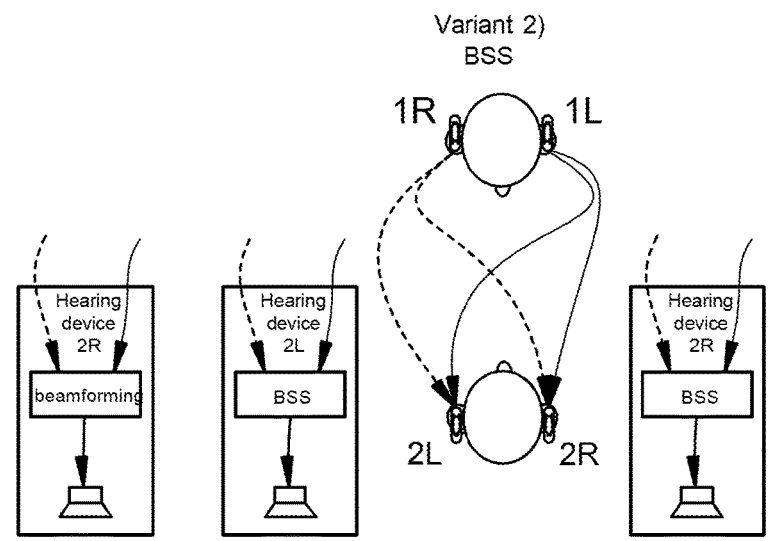
FIG. 11B
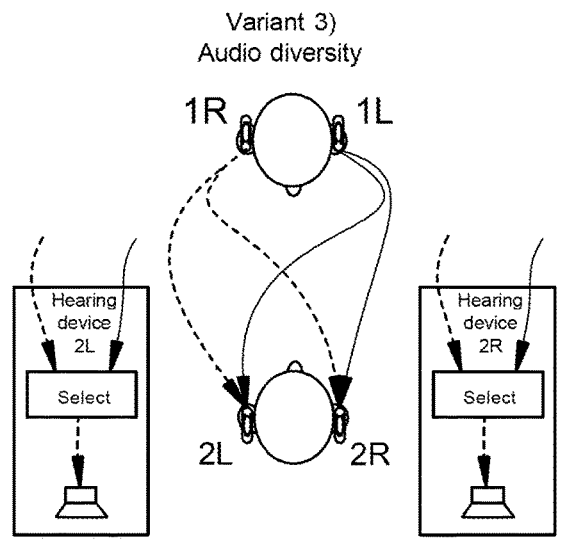
FIG. 11C

DUAL WIRELESS AUDIO STREAMS TRANSMISSION ALLOWING FOR SPATIAL DIVERSITY OR OWN VOICE PICKUP (OVPU)

FIELD OF INVENTION

The following description relates generally to an audio communication system and a method for operating an audio communication system. More specifically, the following description relates to a scheme exploiting diversity in transmission to improve the communication range or to improve audio quality.

BACKGROUND OF INVENTION

Wireless technologies allow wireless communications between hearing devices and/or between hearing devices and audio sources. The audio source can be an external device (such as a mobile phone, tablet, iPod, etc.) or a microphone for capturing the speaker's voice, for example. In wireless communications between hearing devices, the user's voice is captured by a microphone that may be part of a transmission unit of a hearing device worn by the user. The captured audio is directly wirelessly transmitted towards another hearing device, which receives the audio packets. A hearing device usually transmits at a power of 0 dBm for power consumption limitation reasons. The antenna of the hearing device is very small and lossy on both the transmission and the reception side. As a result, the transmission range from a transmitting hearing device cannot be as large as the transmission range from a wireless microphone, for example. It may be desirable to increase the transmission range from the transmitting hearing device to be comparable to the transmission range from a wireless microphone, for example. In addition, performing own-voice pickup (OVPU) using microphones at the user's ear is not ideal because of the large distance between the user's ear and mouth. It may further be desirable to improve OVPU audio quality in noisy environments.

SUMMARY

The present invention provides improved audio transmission between audio communication systems that include a plurality of audio communication devices worn by at least two users. At least one of the audio communication devices is an audio transmitting device and at least one audio communication device is an audio receiving device. Specifically, the present invention proposes solutions to increase the transmission range from the audio transmitting devices by having each audio transmitting device pickup and transmit its own user's voice, such that the audio receiving devices can receive the best from both streams (i.e., transmit diversity). As a result, the achieved transmission range may not be limited where the audio transmitting device may be shadowed by the user's head, for example. Improving the reception range (i.e., reception diversity) may also be achieved. Combining transmit diversity and reception diversity can provide an improved range regardless of the orientation of the user's head on both the transmitter and receiver side.

In one general aspect, an audio transmission method between at least two audio communication systems including a transmitting audio communication system worn and a receiving audio communication system may be provided. The transmitting audio communication system may include a first audio transmitting device and a second audio transmitting device. The receiving audio communication system may include at least one audio receiving device. The audio transmission method may include transmitting a first wireless audio stream, via a first wireless audio link, by the first audio transmitting device and a second wireless audio stream, via a second wireless audio link, by the second audio transmitting device. The audio transmission method may further include selecting, by the at least one audio receiving device, one of the first wireless audio stream or the second wireless audio stream based on quality parameters of the first wireless audio link and/or the second wireless audio link.

In the method according to the foregoing aspect, at least one of the first wireless audio stream or the second wireless audio stream may contain a voice of a first user.

In the method according to the foregoing aspect, at least one of the first audio transmitting device or the second audio transmitting device may be configured to be worn by a first user, and the at least one audio receiving device may be configured to be worn by a second user.

In the method according to the foregoing aspect, the first wireless audio stream and the second wireless audio stream are both transmitted as audio data packets, and the transmission of at least some of the audio data packets overlaps in time, but not in frequency.

In the method according to the foregoing aspect, each audio data packet of the first wireless audio stream and the second wireless audio stream is transmitted in a separate time slot of a Time Division Multiple Access (TDMA) frame.

In the method according to the foregoing aspect, the selecting, by the at least one audio receiving device, one of the first wireless audio stream or the second wireless audio stream, may include selecting the first wireless audio stream when a quality parameter of the first wireless audio link is above a pre-defined quality threshold or better than a quality parameter of the second wireless audio link.

In the method according to the foregoing aspect, the selecting, by the at least one audio receiving device, one of the first wireless audio stream or the second wireless audio stream, may include selecting the second wireless audio stream when a quality parameter of the second wireless audio link is above a pre-defined quality threshold or better than a quality parameter of the first wireless audio link.

In the method according to the foregoing aspect, the quality parameter of the first wireless audio link and the quality parameter of the second wireless audio link may be link quality parameters including audio received signal strength, audio signal strength to noise ratio, or packet error rate.

In the method according to the foregoing aspect, the quality parameter of the first wireless audio link and the quality parameter of the second wireless audio link may be audio quality parameters including signal to noise ratio.

In another general aspect, an audio transmission method between at least two audio communication systems including a transmitting audio communication system and a receiving audio communication system may be provided. The transmitting audio communication system may include a first audio transmitting device and a second audio transmitting device. The receiving audio communication system may include at least one audio receiving device. The audio transmission method may include transmitting a first wireless audio stream, via a first wireless audio link, by the first audio transmitting device and a second wireless audio stream, via a second wireless audio link, by the second audio transmitting device. The audio transmission method may further include selecting, by the at least one audio receiving device, one of the first wireless audio stream or the second wireless audio stream based on quality parameters of the first wireless audio link and/or the second wireless audio link. When the at least one audio receiving device selects both the first wireless audio stream and the second wireless audio stream, the audio transmission method may include applying a signal processing algorithm exploiting both the first wireless audio stream and the second wireless audio stream, with the signal processing algorithm improving a signal to noise ratio of an own voice pickup signal.

In the method according to the foregoing aspect, at least one of the first audio transmitting device or the second audio transmitting device is configured to be worn by a first user, and the at least one audio receiving device is configured to be worn by a second user.

In the method according to the foregoing aspect, at least one of the first wireless audio stream or the second wireless audio stream contains a voice of a user.

In the method according to the foregoing aspect, the first wireless audio stream and the second wireless audio stream are both transmitted as audio data packets, and the transmission of at least some of the audio data packets does not overlap in time.

In the method according to the foregoing aspect, the selecting, by the at least one audio receiving device, one of the first wireless audio stream or the second wireless audio stream, may include selecting the first wireless audio stream when a quality parameter of the first wireless audio link is above a pre-defined quality threshold or better than a quality parameter of the second wireless audio link.

In the method according to the foregoing aspect, the selecting, by the at least one audio receiving device, one of the first wireless audio stream or the second wireless audio stream, may include selecting the second wireless audio stream when a quality parameter of the second wireless audio link is above a pre-defined quality threshold or better than a quality parameter of the first wireless audio link.

In the method according to the foregoing aspect, the quality parameter of the first wireless audio link and the quality parameter of the second wireless audio link may be link quality parameters including audio received signal strength, audio signal strength to noise ratio, or packet error rate.

In the method according to the foregoing aspect, the quality parameter of the first wireless audio link and the quality parameter of the second wireless audio link may be audio quality parameters including signal to noise ratio.

In the method according to the foregoing aspect, the signal processing algorithm may be a binaural beamforming algorithm or a blind source separation algorithm.

In the method according to the foregoing aspect, the binaural beamforming algorithm may be performed at the receiving audio communication system.

In another general aspect, an audio communication network may include a first audio communication system including a first audio transmitting device and a second audio transmitting device, and a second audio communication system including at least one audio receiving device. The first audio transmitting device and the second audio transmitting device may be configured to transmit a first wireless audio stream, via a first wireless audio link, and a second wireless audio stream, via a second wireless audio link, respectively. The at least one audio receiving device may be configured to select one of the first wireless audio stream or the second wireless audio stream based on quality parameters of the first wireless audio link and/or the second wireless audio link.

In the audio communication network according to the foregoing aspect, the first audio transmitting device and the second audio transmitting device may be configured to be respectively worn at one of each ear of a first user.

In the audio communication network according to the foregoing aspect, the at least one audio receiving device may be configured to be worn by a second user.

In another general aspect, an audio transmission method between at least two audio communication systems including a transmitting audio communication system and a receiving audio communication system may be provided. The transmitting audio communication system may include a first audio transmitting device and a second audio transmitting device. The audio receiving device system may include at least one audio receiving device. The audio transmission method may include transmitting a first wireless audio stream, via a first wireless audio link, by the first audio transmitting device and a second wireless audio stream, via a second wireless audio link, by the second audio transmitting device. The audio transmission method may further include receiving, at the receiving device both the first wireless audio stream and the second wireless audio stream, and applying a signal processing algorithm exploiting both the first wireless audio stream and the second wireless audio stream, with the signal processing algorithm improving a signal to noise ratio of an own voice pickup signal.

Other features and aspects may be apparent from the following detailed description, the drawings, and the claims.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIGS. 6A-6C are schematic diagrams illustrating the benefit of the transmit diversity method of FIG. 5A;

FIG. 10 is a schematic diagram illustrating transmit diversity in a full-duplex case, according to an embodiment;

FIGS. 11A-11C are schematic diagrams illustrating three methods for own-voice pickup (OVPU) audio quality improvement, according to three embodiments;

Figure 1:
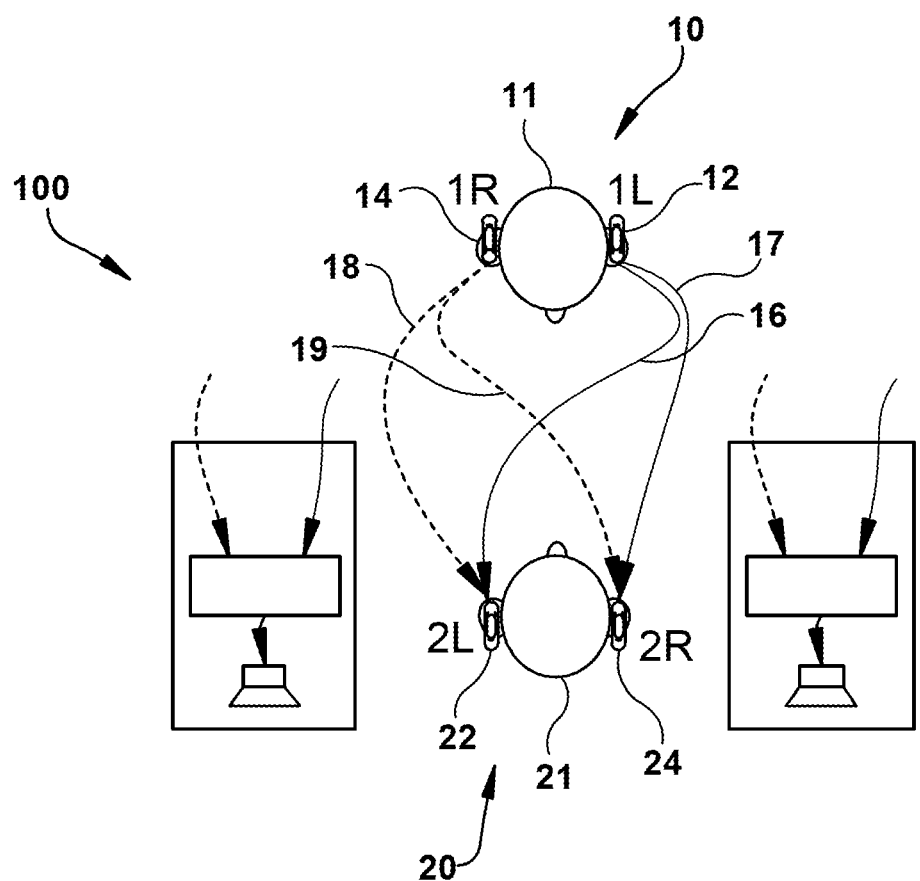
FIG. 1 is a schematic diagram of audio transmission between two audio communication systems, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation.

Within the context of the following description, hearing devices (such as hearing aids, hearing prostheses, cochlear implants, earphones, etc.) are specifically utilized by individuals to hear audio from another device or from the user's surroundings and may be used, for example in order to compensate hearing loss and/or improve hearing ability. A pair of hearing devices, one intended to be worn at the left and the other at the right ear of the user, which are linked to one another is referred to as a binaural hearing system. Different styles of hearing devices exist in the form of behind-the-ear (BTE), in-the-ear (ITE), completely-in-canal (CIC) types, as well as hybrid designs consisting of an outside-the-ear part and an in-the-ear part, the latter typically including a receiver (i.e., a miniature loudspeaker), therefore commonly termed receiver-in-the-ear (RITE), receiver-in-canal (RIC), or canal-receiver-technology (CRT) hearing devices. Depending on the severity and/or cause of the user's hearing loss, other electro-mechanical output transducers, such as a bone-anchored vibrator, a direct acoustic cochlear simulator (DACS) or cochlear implant (CI) can be employed instead of a receiver. Other uses of hearing devices pertain to augmenting the hearing of normal hearing persons, for instance by means of noise suppression, to the provision of audio signals originating from remote sources, e.g., within the context of audio communication, and for hearing protection.

Hearing devices with multiple separate units, such as one intended to be worn at the left and the other at the right ear of the user, for example, allow communication between the two hearing device units, as well as communication with other devices, such as a mobile phone or a portable audio player. This communication may take place via a remote auxiliary unit, such as a hub, that acts as a communication relay. Advances in wireless technology allow direct wireless communications between a hearing device and audio sources, such as mobile phones (e.g., iPhone, Android, Blackberry, etc.), media players (e.g., iPod, MP3 player, etc.), computers (e.g., PC, Apple computer, etc.), and audio/video (A/V) receivers that can be part of a home entertainment or home theater system, for example.

Hearing devices can be used for wireless communications between hearing devices, to make and receive telephone calls to/from another user, and stream audio using an external audio source, such as mobile phone, using a bi-directional hands-free profile. A communication network may include a plurality of audio communication systems configured as communication systems on the transmission side and on the receiver side for implementing a network architecture, usually in a master-slave topology. An example schematic diagram of a communication network 100 with two audio communication systems 10 and 20 is illustrated in FIG. 1. The audio communication system 10 can include a first hearing device 12, which may be configured for the left ear of a first user 11, and a second hearing device 14, which may be configured for the right ear of the first user 11. Each of the hearing devices 12 and 14 can have at least one of (or both) a microphone and a loudspeaker. Each of the hearing devices 12 and 14 can be configured as a headset, hearable, hearing aid, implant, hearing protection, etc. As described here, the audio communication system 10 is configured as a transmitting audio communication system, but can also be configured as a receiving audio communication system. One of the hearing devices 12 or 14 of the transmitting audio communication system 10 may act as a master device. The audio communication system 20 can include at least one receiving hearing device. For example, the audio communication system 20 can include only one receiving hearing device: a third hearing device 22. Alternatively, the audio communication system 20 can include two receiving hearing devices: the third hearing device 22, which may be configured for the left ear of a second user 21, and a fourth hearing device 24, which may be configured for the right ear of the second user 21. As described herein, the audio communication system 20 is configured as a receiving audio communication system, but can also be configured as a transmitting audio communication system. The hearing devices 22 and 24 of the receiving audio communication system 20 and one of the hearing devices 12 or 14 of the transmitting audio communication system 10 may act as slave devices.

Audio packets (e.g., voice captured by a microphone, voice for a telephone call, voice commands to applications stored on a mobile phone, etc.) can be transmitted, by the first hearing device 12 and the second hearing device 14, and received, by the at least one receiving (e.g., third) hearing device 22 and/or the fourth hearing device 24, through wireless links using wireless communication protocols, such as Bluetooth® or Wi-Fi® (based on the IEEE 802.11 family of standards of the Institute of Electrical and Electronics Engineers), or the like, as well as other radio frequency (RF) communication protocols, for example. Among such pointto-point wireless communications are protocols that conform to the Bluetooth specification promulgated by the Bluetooth Special Interest Group of Bellevue, Wash. The Bluetooth Core Specification specifies both the Bluetooth Classic variant of Bluetooth, also known as Bluetooth BR/EDR, as well as Bluetooth Low Energy variant of Bluetooth, also known as Bluetooth LE, or BLE. Advances in integrated chip design have made it possible to develop a chip that supports both Bluetooth Classic and Bluetooth Low Energy and that has a size and a power consumption performance that is suitable for the capabilities of hearing devices.

The hearing devices 12, 14, 22, and 24 can be electro-acoustic transducers configured to convert audio information into sound. Such electro-acoustic transducers can include but are not limited to earphones, ear buds, hearing aids, speakers, headphones, etc., for example. The first hearing device 12 may be configured as a left channel speaker for a stereo channel and the second hearing device 14 may be configured as a right channel speaker for a stereo channel, or vice-versa. Likewise, the third hearing device 22 may be configured as a left channel speaker for a stereo channel and the fourth hearing device 24 may be configured as a right channel speaker for a stereo channel, or vice-versa.

Each of the hearing devices 12, 14, 22, and 24 shown in FIG. 1 can include an input microphone system configured to capture an audio signal and convert the audio signal into an electrical input signal. The microphone system of the hearing devices 12, 14, 22, and 24 can include only one input microphone or more than one input microphone. The microphones may be directional, i.e., may pick up most sounds in front a person wearing the microphone, or omnidirectional, i.e., may pick up sounds from all directions. In addition to the input microphone(s), further receiving means for receiving signals may be present, such as a telecoil receiver, a receiving unit including an antenna for receiving wirelessly transmitted signals, etc. For example, a streamed audio input signal (such as a phone call or music, for example) can be received from a streaming input source, such as an audio source, for example, by a wireless connection, such as wireless point-to-point link, for example.

The audio signals captured by the input microphones of the hearing devices 12, 14, 22, and 24 can be supplied to an acoustic beam-former that may generate an output signal supplied to a gain model unit. The electrical input signals obtained from the input microphones of the hearing devices 12, 14, 22, and 24 can be processed by one or more signal processors that can convert the electrical input signals into digital signals that can be processed further to obtain an electrical output signal. A desired electrical input signal can be the electrical input signal obtained by the input microphones, the streamed audio input signal, or a mix of both input signals. The electrical output signal can be converted into an acoustic output signal by a receiver (also known as a "speaker") of each of the hearing devices 12, 14, 22, and 24 and can be emitted into the remaining volume between the user's eardrum and the earpiece or the in-the-ear-canal-component of the hearing devices 12, 14, 22, and 24.

The signal processor may be a single digital signal processor or may be made up of different, potentially distributed processor units, preferably including at least one digital signal processor unit. The signal processor can include one or more of a microprocessor, a microcontroller, a digital signal processor (DSP), an application specific integrated circuit (ASIC), a field-programmable gate array (FPGA), discrete logic circuitry, or the like. The signal processor may be further adapted to differentiate sounds, such as speech and background noise, and process the sounds differently for a seamless hearing experience. The signal processor can further apply a gain model to the captured audio signals and support cancellation of feedback or noise from wind, ambient disturbances, etc.

The signal processor can further include memory (not shown in FIG. 1) and may store tables with pre-determined values, ranges, and thresholds, as well as program instructions that may cause the signal processor to access the memory, execute the program instructions, and provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The signal processor can further include one or more analog-to-digital (A/D) and digital-to-analog (D/A) converters for converting various analog inputs to the signal processor, such as analog input from the microphones of the hearing devices 12, 14, 22, and 24, for example, in digital signals and for converting various digital outputs from the signal processor to analog signals representing audible sound data which can be applied to the speakers of the hearing devices 12, 14, 22, and 24, for example.

Each of the hearing devices 12, 14, 22, and 24 can be configured to wirelessly receive audio or other signals from each other, from the audio source 12, or from another device, component or system, such as a remote hearing device controller, a hearing loop system, an audio link device, or a streaming device, for example. Each of the of the hearing devices 12, 14, 22, and 24 can include a wireless communication unit, such as a transceiver, for example, configured to receive and optionally to transmit wireless signals to other devices. In the example of FIG. 1, the hearing devices 12 and 14 are illustrated as transmitting hearing devices, and the hearing devices 22 and 24 are illustrated as receiving hearing devices. For example, each of the hearing devices 12, 14, 22, and 24 may transmit and receive wireless audio signals to and from the other hearing devices 12, 14, 22, and 24, and/or control signals from a remote device via an antenna, and convey these signals to the signal processor or to each other. In certain embodiments, the transceiver may be a part of the signal processor of the hearing devices 12, 14, 22, and 24. Specifically, the signal processor of the hearing devices 12, 14, 22, and 24 can employ a Bluetooth receiver, an audio codec that provides the audio signal conveyed by one of the hearing devices 12, 14, 22, and 24, or by an external device, such as the audio source, for example, in digitized form, and a decoder that decodes the digitized audio signal. Alternatively, the transceiver may include its own Bluetooth on-board signal processor. The processed audio signals and the control data/commands may be supplied to a digital transmitter of the transmitting hearing devices 12 and 14, which may be likewise controlled by the signal processor. The digital transmitter can then transmit the modulated signals via an antenna to an antenna arrangement of a digital receiver unit of the receiving hearing devices 22 and 24, thereby establishing digital links 16, 17, 18, and 19 for transmission and receipt of audio signals as audio data packets. The digital links 16, 17, 18, and 19 can conform to the Bluetooth protocol. The digital links 16, 17, 18, and 19 may also be configured for bi-directional communications allowing transmission and receipt of audio packets, control data, such as volume control or a query regarding the status of the receiving device (e.g., battery state, parameter settings, etc.), as well as transmission and receipt of acknowledgements by the hearing devices 12, 14, 22, and 24 that an audio packet was successfully transmitted or received, for example. The bi-directional digital links 16, 17, 18, and 19 can minimize the number of audio packet re-transmissions when an audio packet has been received and no retransmission is necessary.

Figure 2:
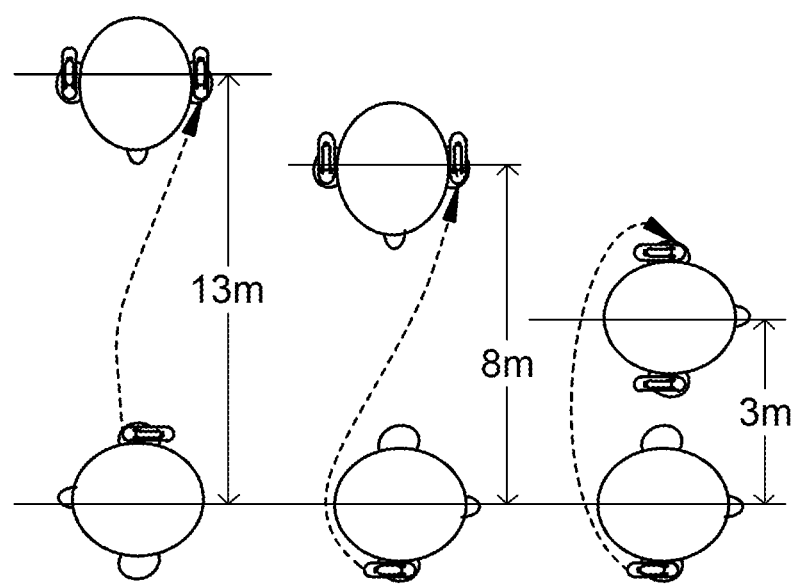
FIG. 2 is a schematic diagram illustrating an issue of reduced transmission range from hearing devices depending on the position of the user's head, according to an embodiment.

In wireless communications between hearing devices, the user's voice is captured by a microphone that may be part of a transmission unit of a hearing device worn by a user. The captured audio can be transmitted wirelessly directly towards another hearing device, which can receive the audio packets. A hearing device usually transmits at a power of 0 dBm for power consumption limitation reasons. The antenna of the hearing device is very small and lossy on both the transmission and the reception side. As a result, the transmission range from a transmitting hearing device cannot be as large as the transmission range from a wireless microphone, for example. Because of these limitations in the transmission range from a transmitting hearing device, in situations where the distance between the hearing devices exceeds a certain range or where the transmitting hearing device may be shadowed by the user's head, for example, the wireless link quality can deteriorate and the quality of the transmitted audio can deteriorate as a result. For example, FIG. 2 illustrates the issue of reduction in the transmission range from hearing devices utilizing a wireless audio streaming protocol depending on the position of the user's head. As shown in FIG. 2, an achieved range outdoors may be 13 m (meters) in line of sight, 8 meters with one-time head shadowing, and only 3 meters with two times head shadowing. Considering 0 dBm Tx power and 0 dBi loss in a transmit antenna, 15 dB loss in the reception antenna and −95 dBm sensitivity, in the radio chip, a link budget of −15−(−95)=80 dB is available. Considering a propagation loss of 20*log 10(4*pi*2450E6/3E8)+20*log 10(3)=50 dB at 3 m. Head shadowing can typically cause an additional attenuation of 20 dB. With two times head shadowing, the link marking becomes only 10 dB at 3 m. In some situations, the link may be completely lost.

Wireless radio links may be negatively influenced by multi-path fading when the receiving hearing devices may only able to receive a single stream from one of the transmitting hearing devices due to head shadowing, as shown in FIG. 2, for example. Due to reflections of the radio waves on the ground or on other objects, destructive interference may occur and cause a reduction in the received signal amplitude, depending on the position of the transmitter. However, when a plurality of antennas are used, it is likely that, if the signal is suffering from multi-path fading at the location of one of the antennas, there may be no multi-path fading at one of the other antennas. Typically, a receiving device have several antennas and use the so called "switched diversity" method, where the signal power at two spaced apart antennas is measured and the input of the radio demodulator is switched to that antenna which presently provides for the higher signal power, i.e., that antenna which presently suffers less from multi-path fading. In the disclosed invention, a receiver can only have one antenna due to space limitation reasons. Instead of switching between two reception antennas, a receiver switches between the signal transmitted by two antennas, providing the same multi-path effect mitigation benefit.

Figure 3:
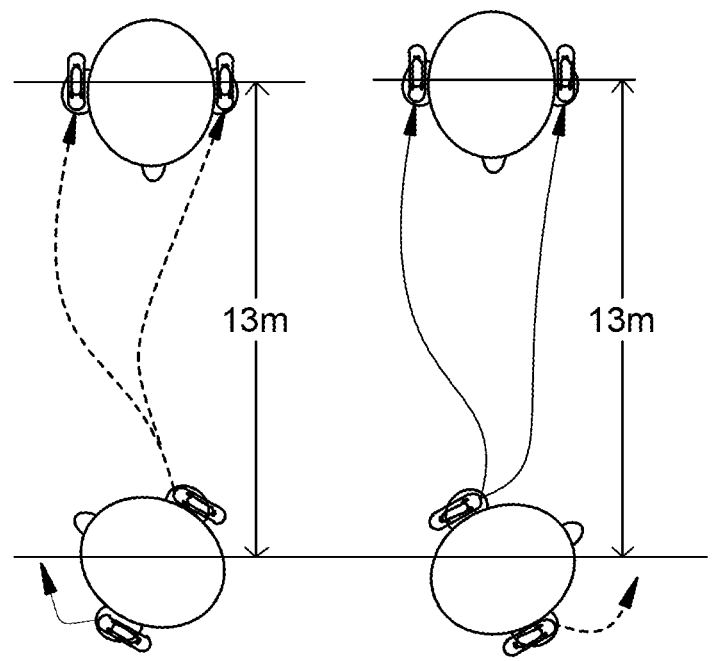
FIG. 3 is a schematic diagram illustrating a transmission range improvement with transmit diversity, according to an embodiment.
Figure 4:
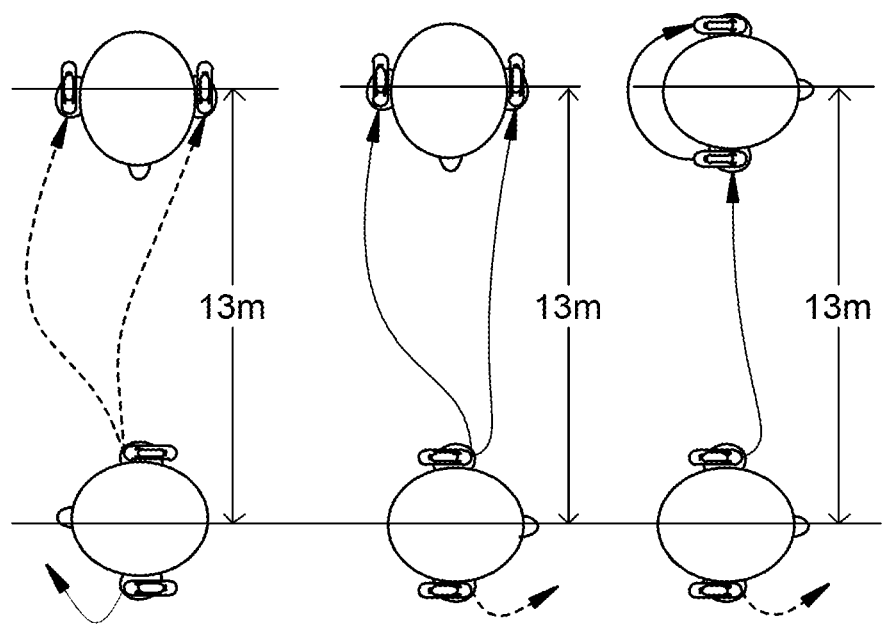
FIG. 4 is a schematic diagram a combined method of range improvement with transmit diversity and receive diversity, according to an embodiment.

The methods described herein implement an audio stream-level diversity on the receiver side and/or on the transmitter side by concurrently transmitting two separate wireless audio streams that contain the user's voice on two separate wireless audio links by two transmitting hearing devices, monitoring quality parameters of the two wireless audio links, and receiving on the receiving side the wireless audio stream that was transmitted on the wireless audio link that has better quality parameters. This stream-level diversity can improve the transmission performance in a simple but efficient manner. As illustrated in FIG. 3, the methods described herein can increase the transmission range from the transmitting hearing devices by having each transmitting hearing device pickup and transmit its own voice, such that the receiving hearing devices can receive the best from both streams (i.e., transmit diversity or dual transmission). As a result, the achieved transmission range may not be limited where the transmitting hearing device may be shadowed by the user's head, for example.

Turning back to FIG. 1, each of the transmitting hearing devices 12 and 14 transmits concurrently (i.e., at the same time or as a dual transmission) two separate wireless audio streams as audio data packets through the digital links 16, 17, 18, and 19 to each of the receiving hearing devices 22 and 24. Each audio data packet is serially transmitted in a separate slot or is repeatedly transmitted in a group of consecutive slots of a Time Division Multiple Access (TDMA) frame including a plurality of time slots. Each of the two wireless audio streams contains the voice of the first user 11 captured by a microphone or microphones of the transmitting hearing devices 12 and 14. The audio data packets that are concurrently transmitted by the first and second hearing devices 12 and 14 may be the same or different, depending on the situation including, but not limited to, the following examples of different situations.

If each of the first and second hearing devices 12 and 14 transmits audio including the user's voice captured by their respective microphones, the audio packets may be different, depending on ambient noise that may be present next to each hearing device, because the time at which audio is sampled may be slightly different on each side, or based on differences in microphone parameters, for example.

Figure 5A:
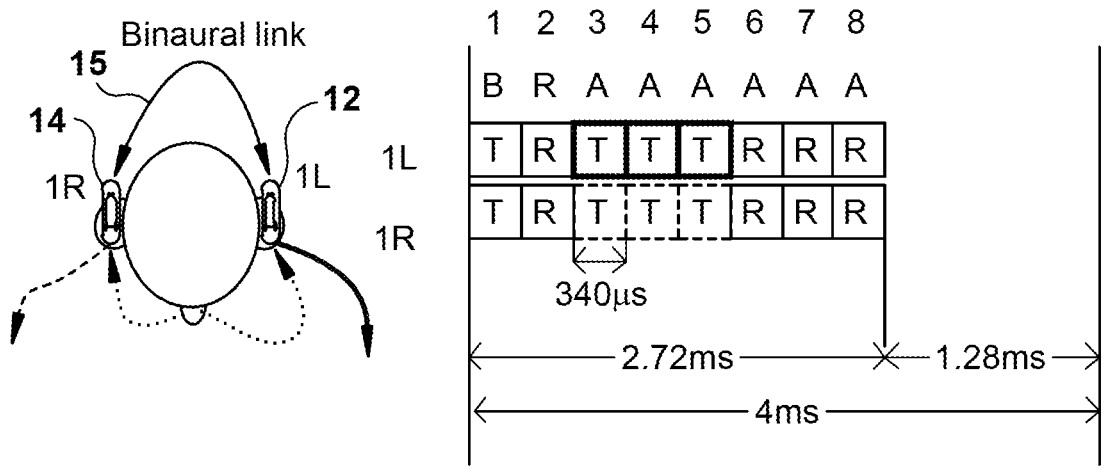
FIG. 5A is a schematic diagram illustrating Time Division Multiple Access (TDMA) schedule for transmit diversity with audio from a left and right hearing devices transmitted at the same time, according to an embodiment.
Figure 5B:
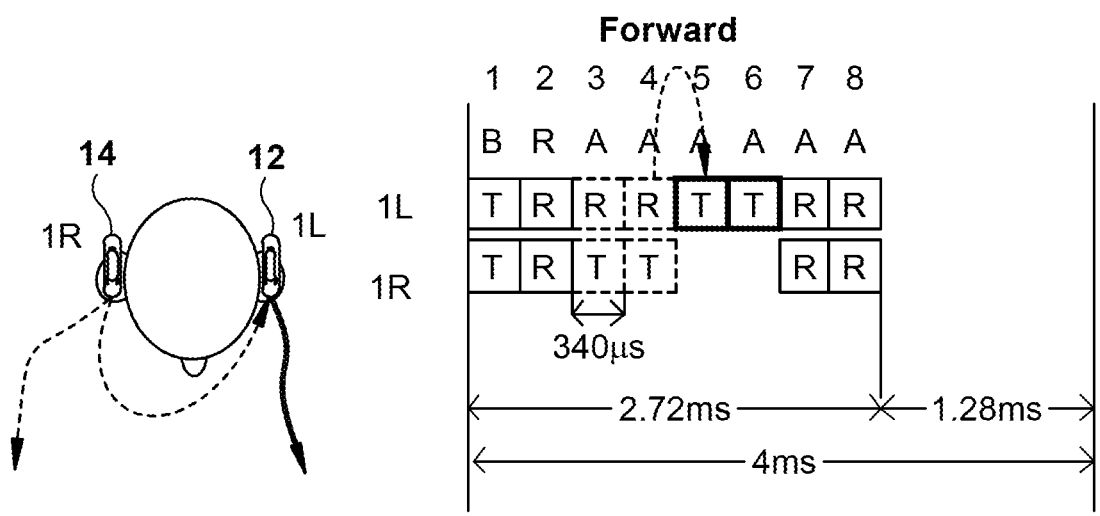
FIG. 5B is a schematic diagram illustrating Time Division Multiple Access (TDMA) schedule for transmit diversity with audio transmitted from a right hearing device to both a left hearing aid and to remote devices, according to an embodiment.

Alternatively, if the first and second hearing devices 12 and 14 derive one audio signal from one microphone or from both microphones via binaural link 15 (as shown in FIG. 5A, for example), then both the first and the second hearing devices 12 and 14 would transmit the same audio packets. A binaural audio link can be implemented, for example, via a dedicated radio using an inductive link at a dedicated frequency, or via the same radio using a RF link in the same frequency band as the wireless links 16-18 of FIG. 1. Instead of having a dedicated binaural audio RF transmission, as illustrated in FIG. 5B, for example, it is possible that one hearing aid is transmitting the same audio packet to both the other hearing aid and to remote devices (not shown in FIG. 5B). Further, one of the first and second hearing devices 12 and 14 can forward audio from one side to the other side via the binaural link, and then can transmit it. This may be an advantage when one side is known to be better, i.e., when the other side suffers from wind noise, for example. In this case, it may be advantageous to transmit the best audio signal from both sides.

Likewise, in a case when each of the first and second hearing devices 12 and 14 transmits audio from an audio source (e.g., mobile phone, for example), the first hearing device 12 and the second hearing device 14 can both transmit two transmission channels (left and right). In this case the audio packets can be the same. Similarly, in a case when each of the first and second hearing devices 12 and 14 transmits monophonic audio using one transmission channel, the audio packets can be the same. On the other hand, in a case when the first hearing device 12 transmits only one (e.g., left) channel and the second hearing device 14 transmits only (e.g., right) channel, the audio packets can be different for at least some or all of the reasons described above.

Turning back to FIG. 1, the dual transmission by the transmitting hearing devices 12 and 14 can be accomplished in two ways—in one embodiment, the two audio streams overlap in time and in another embodiment, the two audio streams do not overlap in time.

In one embodiment, audio packets are transmitted by both hearing devices 12 and 14 concurrently, but on different frequencies. Each audio data packet is transmitted in a separate slot of a Time Division Multiple Access (TDMA) frame including a plurality (for example 8 or 10) time slots, with each slot being associated with a different transmission frequency. FIG. 5A illustrates a preferred protocol time scheduling for the transmission of audio from two hearing devices (left and right) 12 and 14. In FIG. 5A, the slot designation "T" means transmission and the slot designation and "R" means reception of audio data packets. In the example shown in FIG. 5A, the TDMA frame has a length of 4 ms and is divided into 8 time slots, each having a length of 340 µs. The first slot (slot 1 in FIG. 5A) may be allocated to the periodic transmission of a beacon packet, which is sent alternatively from the two hearing devices 12 and 14. The beacon packet may contain the sequence number numbering of the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units. The second slot (slot 2 in FIG. 5A) may be allocated for receiving responses from other devices in the network, such as response data from slave devices (such as the receiving hearing devices 22 and 24, for example) of the network, which can respond to requests from the master device through the beacon packet. At least some of the other slots may be allocated to the transmission of audio data packets, wherein each audio data packet is repeated at least once, typically in subsequent slots. In the example shown in FIG. 5A, the slots 3, 4, and 5 may be allocated for a three-fold transmission of the same audio data packet. The slots 6, 7, and 8 may be allocated for the reception of audio transmitted by other users (e.g., external hearing devices, audio sources, etc.). The free time of 1.28 ms duration after slot 8 may be used for binaural communication or communication with other devices, such as for maintain a Bluetooth connection with a smartphone. The hearing device 12 may repeat the transmission of the same audio packet unconditionally three times in the slots 3, 4, and 5. The hearing device 14 may repeat the transmission of the same audio packet unconditionally three times in the same slots 3, 4, and 5, but at different frequencies as compared to the transmissions by the hearing device 12. Each slot can be associated with a different transmission frequency according to a frequency hopping sequence. For example, the frequencies can be selected by the hearing device 12 according to a pseudo random hopping sequence. For the slots 3, 4, and 5, the hearing device 14 can select different frequencies by selecting a channel index which may be incremented by a fixed number of channels, modulo the number of available number of channels, for example.

Both hearing devices can be connected with a separate binaural wireless link 15. The binaural wireless link 15 can conform to a standard protocol, such as Bluetooth, for example, or can be a proprietary protocol, and can be utilized for network management purposes and/or to coordinate actions between the hearing devices 12 and 14 concerning time synchronization of the transmitted audio packets, for example. The binaural wireless link can utilize inductive or RF radio technology. One hearing device 12 or 14 can serve as a master for the binaural wireless link 15 and the other hearing device 12 or 14 can serve as a slave. The time slots can have duration of 340 µs, for example. Audio packets can have duration of 197 µs and can transport 32 bytes of data that can code 4 ms of audio. 4 ms audio sampled at 16 kHz and coded with a G.722 communications standard in mode 1 (i.e., 64 kbps for 16 kHz audio, 8 bits per 2 audio samples) can result in 32 bytes of data (4e-3*16000/2*8/8). These 32 bytes of data plus 10 bytes overhead may be transmitted at a user data rate of 1.3 Mbps with a duration of 259 µs ((32+10)*8/1.3). Since the radio needs an addition time to start and stop, a slot size of 340 µs may be considered. The eight time slots needed for the wireless protocol typically use only 2.72 ms out of the 4 ms period, leaving 1.28 ms unused for coexistence with other protocols, such as the binaural wireless link 15, Bluetooth low energy, or Bluetooth classic, for example (1.28/4=32%).

FIGS. 6A-6C are schematic diagrams that illustrate the benefits of the transmit diversity method of FIG. 5A, depending on the orientation of the user's head in both the transmitting audio communication system 10 and the receiving audio communication system 20.

As shown in FIG. 6A, the audio communication system 20 can receive audio signal 16, 17 from the audio communication system 10, while the audio communication system 10 can receive audio signal 66, 67 from the audio communication system 20.

In FIG. 6B, all four audio streams between the audio communication system 10 and the audio communication system 20 can be received and exploited.

In FIG. 6C, the audio communication system 20 can receive audio signal 18, 19 from the audio communication system 10, while the audio communication system 10 can receive audio signal 68, 69 from the audio communication system 20.

The transition from receiving the audio signals 16, 17 towards receiving the audio signals 18, 19 by the audio communication system 20 can be implemented in different ways. For example, the audio communication system 20 can switch to the audio signals 18, 19 when the audio signals 16, 17 are lost.

In another example, the audio communication system 20 can switch to the audio signals 18, 19 when the quality of the audio signals 16, 17 drops below a predetermined threshold.

In yet another example, the audio communication system 20 can monitor the quality of the audio signals 18, 19 in parallel with receiving and monitoring the quality of the audio signals 16, 17, and can switch to the audio signals 18, 19 if the quality of the audio signals 18, 19 is above the quality of the audio signals 16, 17.

The quality of the audio signals 16, 17, 18, and 19 can be measured by using a moving average of the packet error rate, of the audio error rate, or of the received signal strength.

Monitoring the quality of the audio signals 18, 19 in parallel with receiving the audio signals 16, 17 can be implemented by receiving some of the packets from the audio signals 18, 19 in the time slot 5 when it is not necessary to listen for the audio signals 16, 17 in that slot, i.e., when the audio was already correctly received in slots 3 or 4.

Figure 7A:
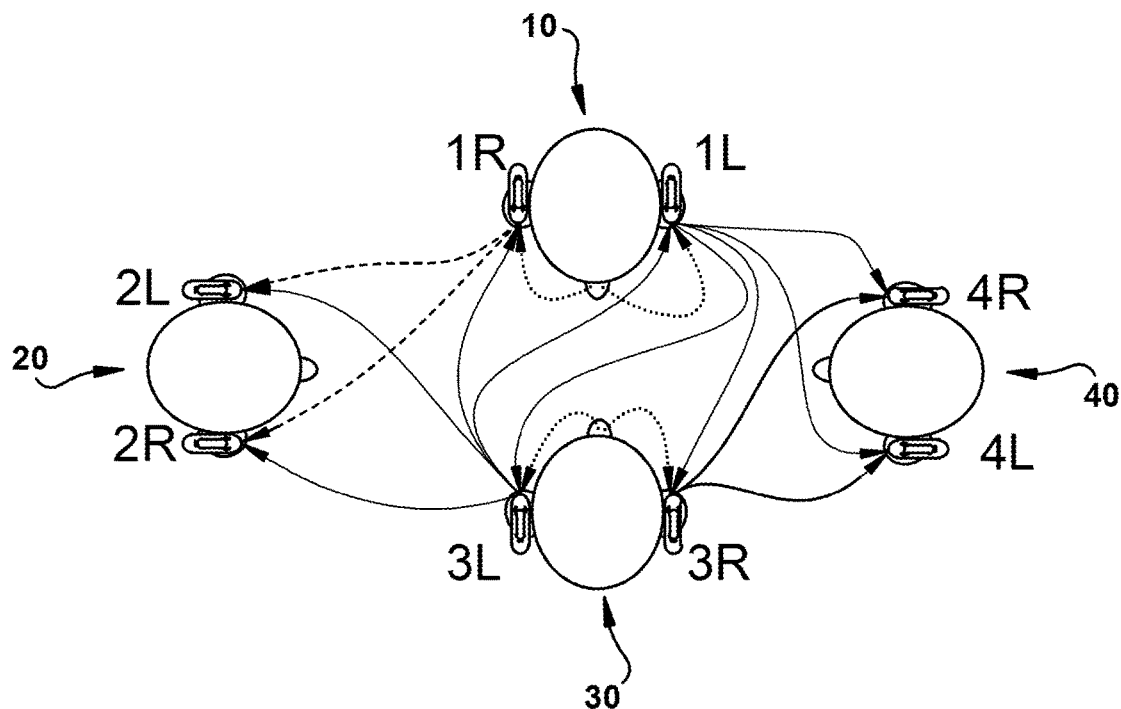
FIG. 7A is a schematic diagram illustrating a 2-out-of-4 wireless network with transmit diversity, according to an embodiment.
Figure 7B:
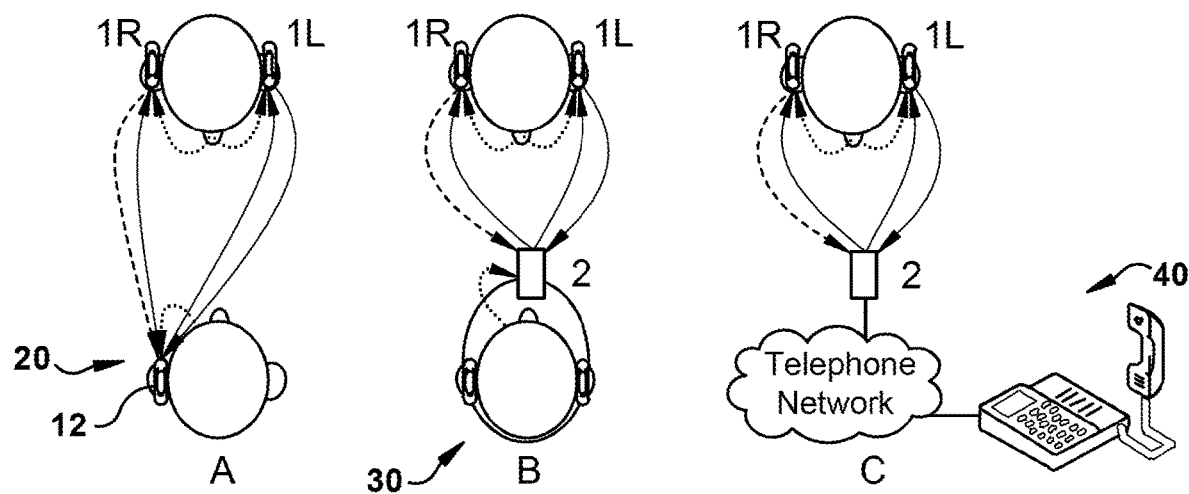
FIG. 7B is a schematic diagram illustrating a single receiving device (e.g., a single hearing aid, neck loop hearing gateway device, conference call assistive listening device) with transmit diversity, according to an embodiment.

The method illustrated in FIGS. 5 and 6A-6C may be utilized for unlimited number of additional audio receivers. FIG. 7A is a schematic diagram illustrating a 2-out-of-4 wireless network with transmit diversity, according to such an embodiment. Specifically, in addition to the transmitting audio communication system 10 and the receiving audio communication system 20, the network illustrated in FIG. 7A may further include receiving audio communication systems 30 and 40. The receiving audio communication systems 30 and 40, as well as the transmitting audio communication system 10 and the receiving audio communication system 20, may receive audio packets from other audio communication systems in the network based on a processing similar to the one described with reference to FIGS. 5 and 6A-6C above. In another embodiment illustrated in FIG. 7B, the receiving audio communication system 20 may include a single receiving hearing device 12 worn at one of the user A's two ears, or the receiving audio communication system 30 may include a single receiving device 2 worn at the user B's neck and using a telecoil loop to transmit audio to hearing aids. In yet another embodiment also illustrated in FIG. 7B, the receiving audio communication system 40 may include a single receiving device 2 that interfaces with the telephone network C to provide an assistive listening function during telephone calls.

Figure 8:
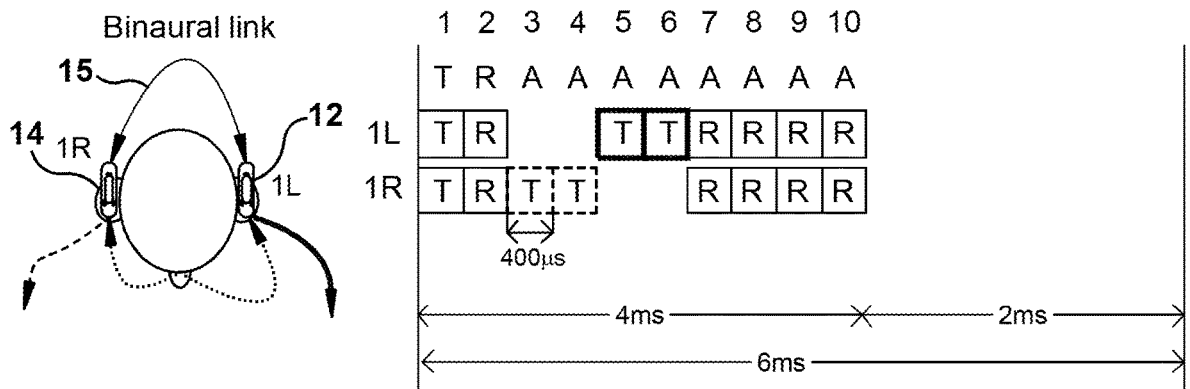
FIG. 8 is a schematic diagram illustrating Time Division Multiple Access (TDMA) schedule for transmit diversity with audio from a left and right hearing devices transmitted at different times, according to an embodiment.

In another embodiment, audio packets can be transmitted by both hearing devices 12 and 14 at different times. The advantage of transmitting both audio streams at different times is to allow the receiving hearing devices 22 and 24 to exploit both audio streams in order to improve the user's own voice pickup. FIG. 8 illustrates a preferred protocol time scheduling for the transmission of audio from the hearing devices 12 and 14. In FIG. 8, the slot designation "T" means transmission and the slot designation and "R" means reception of audio data packets. In the example shown in FIG. 8, the TDMA frame has a length of 6 ms and is divided into 10 time slots, each having a length of 400 µs. The first slot (slot 1 in FIG. 8) may be allocated to the periodic transmission of a beacon packet, which is sent alternatively from the two hearing devices 12 and 14. The beacon packet may contain the sequence number numbering of the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units. The second slot (slot 2 in FIG. 8) may be allocated for receiving responses from other devices in the network, such as response data from slave devices (such as the receiving hearing devices 22 and 24, for example) of the network, which can respond to requests from the master device through the beacon packet. At least some of the other slots may be allocated to the transmission of audio data packets, wherein each audio data packet is repeated at least once, typically in subsequent slots. In the example shown in FIG. 8, the slots 3 and 4 may be allocated for audio transmission from the hearing device 14. As shown in FIG. 8, the slots 3 and 4 may be empty slots (e.g., not used for transmission or reception) for the hearing device 12. Alternatively, the slots 3 and 4 may be allocated for other purposes (e.g., receiving, listening by the hearing device 12 for the transmissions from the hearing device 14 and forwarding transmissions from one hearing device to the other hearing device, etc.). As shown in FIG. 8, the hearing device 12 can receive audio packets in slots 3 and 4, and forward the same audio packets in slots 5 and 6, for example, without audio delay.

The slots 5 and 6 may be allocated for audio transmission from the hearing device 12. As shown in FIG. 8, similarly to slots 3 and 4 for the hearing device 12, the slots 5 and 6 may be empty slots (e.g., not used for transmission or reception) for the hearing device 14. Alternatively, the slots 5 and 6 may be allocated for other purposes (e.g., receiving, listening by the hearing device 14 for the transmissions from the hearing device 12 and forwarding transmissions from one hearing device to the other hearing device, etc.). As shown in FIG. 8, the hearing device 14 can receive audio packets in slots 5 and 6, and forward the same audio packets in slots 7 and 8, for example, without audio delay.

The slots 7-10 may be allocated for the reception of audio transmitted by other users (e.g., external hearing devices, audio sources, etc.). The free time of 2 ms duration after slot 10 may be used for binaural communication or communication with other devices, such as to maintain a Bluetooth connection with a smartphone, for example. Transmitting two audio streams instead of one and receiving two audio streams instead of one requires more resources in the time domain, which may require trade-offs in other domains. In the example shown in FIG. 8, only two audio transmissions are performed instead of three (as in FIG. 5A), which is a trade-off of interference robustness for the benefit of non-time-overlapping dual audio transmissions.

Both hearing devices can be connected with a binaural wireless link 15 for time synchronization. One hearing device 12 or 14 can serve as a master for the binaural wireless link 15 and the other hearing device 12 or 14 can serve as a slave. The time slots can have duration of 400 µs, for example. Audio packets can have duration of 320 µs and can transport 42 bytes of data that can code 6 ms of audio. 6 ms audio sampled at 16 kHz and coded with a G.722 communications standard in mode 2 (i.e., 56 kbps or 7 bits per 2 audio samples) can result in 42 bytes of data (6e-3*16000/2*7/8). These 42 bytes of data plus 10 bytes overhead may be transmitted at a user data rate of 1.3 Mbps with a duration of 320 µs ((42+10)*8/1.3). Since the radio needs in addition time to start and stop, a slot size of 400 µs may be considered. The ten time slots needed for the wireless network protocol typically use only 4 ms out of the 6 ms period, leaving 2 ms for coexistence with other protocols, such as the wireless link 15, Bluetooth low energy, or Bluetooth classic, for example (2/6=33%).

Figure 9A:
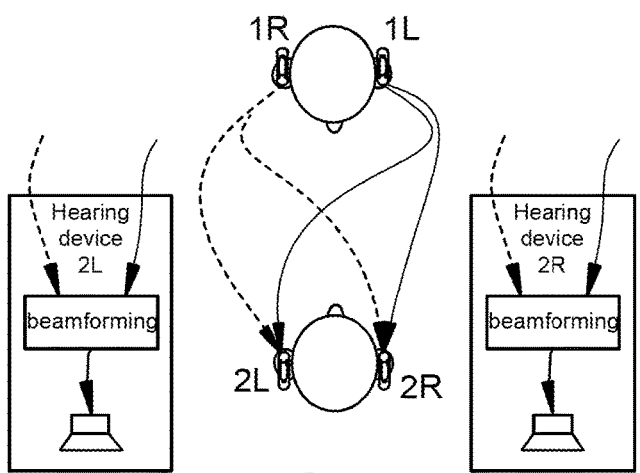
FIGS. 9A-9C are schematic diagrams illustrating the benefit of the transmit diversity method of FIG. 8.
Figure 9B:
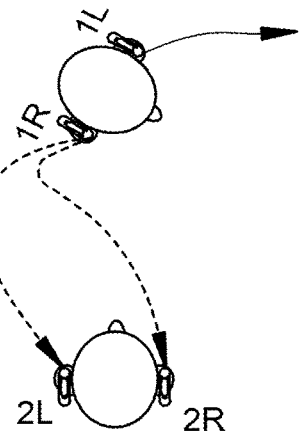
Figure 9C:
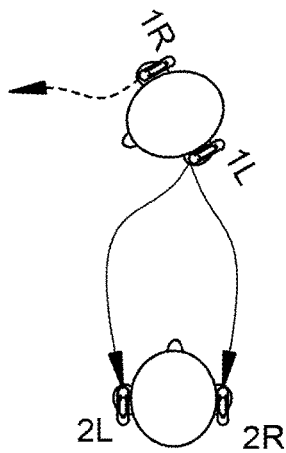

FIGS. 9A-9C are schematic diagrams that illustrate the benefits of the transmit diversity method of FIG. 8, depending on the orientation of the user's head in both the transmitting audio communication system 10 and the receiving audio communication system 20.

When a hearing device worn by one user is capable of receiving the audio signals from both hearing devices worn by another user, the hearing device worn by first user can exploit both audio signals to improve and/or optimize the quality of the voice pickup of the other user (FIG. 9A). When the other user turns his/her head, it is possible that only one of the two audio signals may be received (FIG. 9B and FIG. 9C). In these situations, beamforming can no longer be computed. As a result, the audio signal presented to the ears of the user is based on only one audio signal.

FIGS. 9A-9C illustrate the benefit of the transmit diversity method of FIG. 8 only in a simplex audio transmission, for simplicity reasons. However, the transmit diversity method illustrated in FIGS. 8 and 9A-9C may also be utilized for a full duplex case, as illustrated in FIG. 10, for example.

The method illustrated in FIGS. 8 and 9A-9C may be utilized for unlimited number of additional audio receivers, such as a Two-out-of-N mixing network similar to the 2-out-of-4 wireless network illustrated in FIG. 7, for example.

As mentioned above, another problem in wireless communications between hearing devices arises due to the large distance between the user's mouth and the user's ear where the user's voice is captured by a microphone that may be part of a transmission unit of a hearing device worn by the user. Because of this large distance, performing own-voice pickup (OVPU) using microphones at the user's ear is not ideal. It may be particularly desirable to improve OVPU audio quality in noisy environments. The audio transmission methods described herein may take advantage of having access to the two transmitted audio streams to improve the OVPU audio quality. Specifically, as illustrated in FIGS. 11A-11C, the described audio transmission methods may utilize three solutions to improve the OVPU audio quality—binaural beamformer by implementing a beamforming algorithm, blind source separation (BSS) algorithm, and audio diversity, for example.

In one embodiment illustrated in FIG. 11A, the audio transmission methods may utilize a binaural beamformer by implementing a beamforming algorithm that combines the sound picked-up by both sides to create a beam in the direction of the user's mouth, thereby improving the signal-to-noise ratio. Implementing a beamformer at the transmitting side is described in U.S. Pat. Nos. 5,651,071; 5,511,128; European patent EP 0 855 130 B1; and German patent DE 43 27 901 C1, for example, the entire contents of which are incorporated herein by reference. Briefly, as described in German patent DE 43 27 901 C1, for example, beamforming uses principles of directionality to separate a desired signal from an undesired signal. A processor evaluates audio signals captured by two microphones (e.g., left and right) relative to each other in order to simulate a spatial hearing and suppress noise. The evaluation may include envelope correlation, time correlation, or a combination thereof. Envelope correlation analyzes sound pressure level differences between the microphones assigned to individual frequency ranges. If a sound pressure level difference occurs in one of the frequency ranges, only the weaker signal component is added to the overall signal. Time correlation considers the fact that laterally incident sound waves reach the ear facing away from the sound source and/or its associated microphone at a different time than the ear facing the sound source. The time difference can be processed with a time correlator and a coupling takes place in accordance with a bypass via attenuators.

Figure 12:
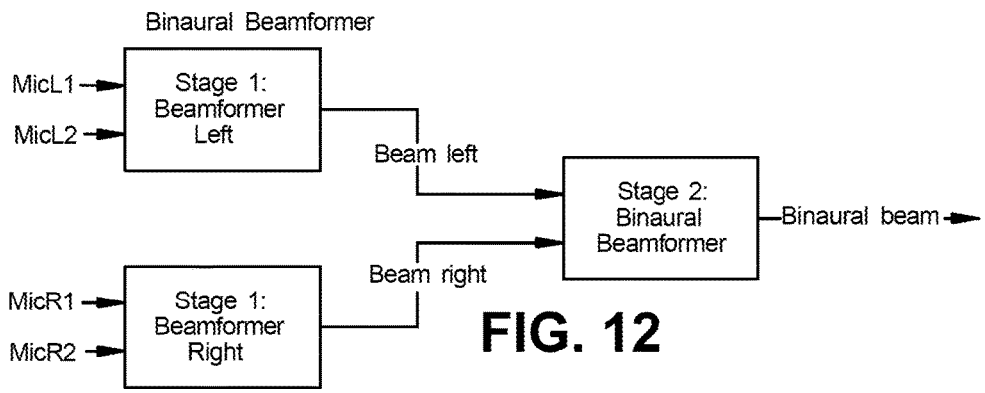
FIG. 12 is a schematic diagram illustrating a two-stage approach for binaural beamforming, according to an embodiment.

The present embodiment implements a beamforming algorithm at the receiver side. To deal with the power/bandwidth constraints of the wireless link in hearing devices systems, binaural beamforming can be performed in a two-stage approach. In doing so, binaural beamforming that exploits all available microphone signals is possible (e.g., two microphones in the left hearing device and two microphones in the right hearing device), while at the same time only one signal per transmitting hearing device can be transmitted/exchanged (FIG. 12).

In a first stage (Stage 1 in FIG. 12), a number M of local microphone signals are combined by a beamforming approach. The filter coefficients for the local beamformers (left and right hearing device) can be optimized offline by considering the Head Related Transfer Functions (HRTFs) and the Acoustics Transfer Functions (ATFs) between the user's mouth and the microphones, using the well-known Minimum Variance Distortionless Response (MVDR) method. The two local beams can be computed individually in the left and the right hearing devices by the following equations:

$$z_{\_L}(\omega) = w_{\_L}(\omega) y_{\_L}(\omega)$$

$$z_{\_R}(\omega) = w_{\_R}(\omega) y_{\_R}(\omega),$$

where the M dimensional column vectors $y_{\_L}(\omega)$ and $y_{\_R}(\omega)$ denote the left and the right microphone signals and the M dimensional row vectors $w_{\_L}(\omega)$ and $w_{\_R}(\omega)$ denote the left and the right beamformer coefficients, respectively.

In a second stage (Stage 2 in FIG. 12), the two lateral beamformer outputs are combined into a binaurally beamformed signal. The optimal beamformer coefficients for the second stage can be determined by applying MVDR optimization. The binaurally beamformed signal is given by the following equation:

$$z_{\_B}(\omega) = w_{\_B}(\omega) z_{\_B}(\omega),$$

with $z_{\_B}(\omega) = [z_{\_L}(\omega) \ z_{\_R}(\omega)]^T$ being the two lateral (left and right) beamformed signals and $w_{\_B}(\omega) = [w_{\_L}(\omega) \ w_{\_R}(\omega)]$ being the binaural beamformer coefficients.

Figure 13:
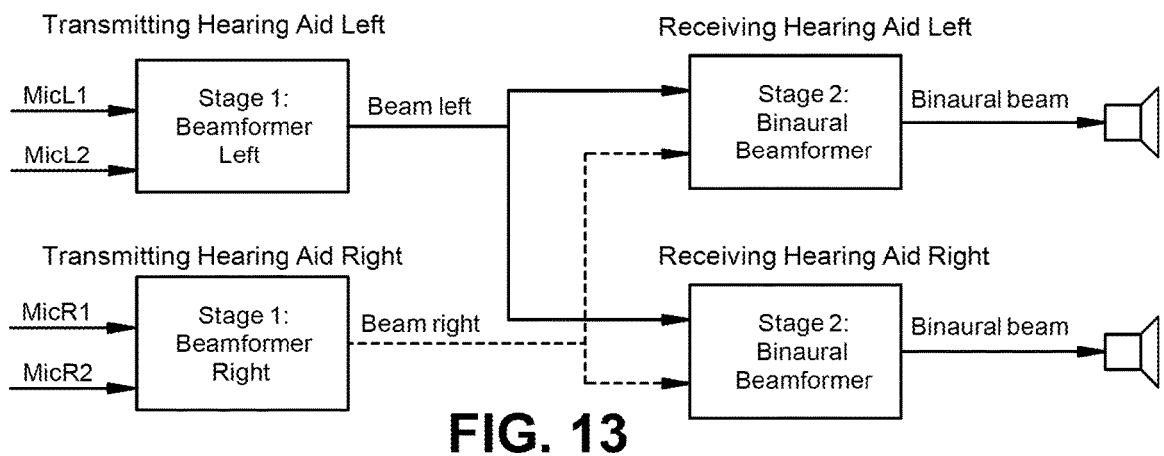
FIG. 13 is a schematic diagram illustrating own-voice pickup (OVPU) with a receiver-side binaural beamforming for a wireless network, according to an embodiment.

To incorporate binaural beamforming for own voice pickup in a wireless network with the aspect of radio diversity in transmitting direction, as described before, it may be beneficial to process the second stage (combining the two locally beamformed signal into a binaural beam) not in the transmitting hearing devices, but in the receiving hearing devices. This approach is shown in FIG. 13, for example.

In conditions where the receiving hearing devices are only able to receive a single stream from one of the transmitting hearing devices (e.g., due to head shadowing shown in FIGS. 9A-9C, for example), the weights vector $w_{\_B}(\omega)$ can be adjusted accordingly by setting the weight for the valid audio stream equal to 1 and the weight of the distorted stream to 0, for example.

This scheme can be extended by incorporating (frequency dependent) quality metrics that are either transmitted together with the audio steam or measured by the receiving hearing devices, e.g., local signal-to-noise ratios (SNRs) of the locally beamformed audio signals or the link quality of the wireless links (e.g., bit error rate). In doing so, a fading between the two audio streams can be implemented as soon as the quality of one the streamed audio signals drops under a certain predetermined threshold. The fading can also be incorporated into the binaural weight vectors $w_{\_B}(\omega)$.

Figure 14:
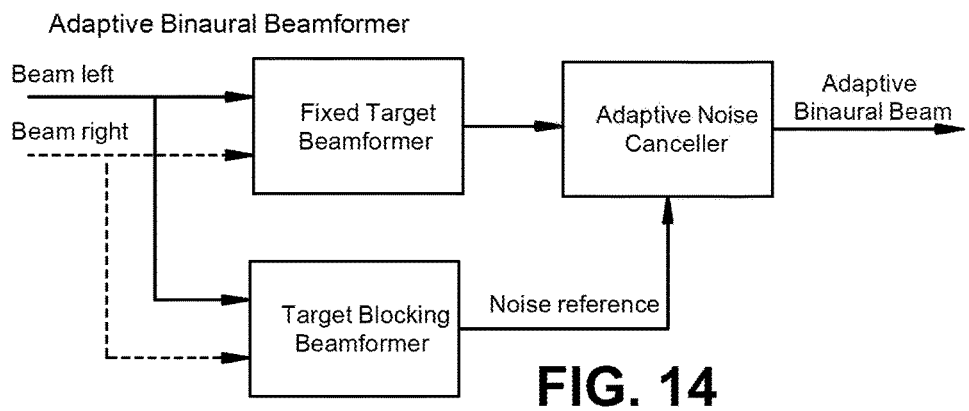
FIG. 14 is a schematic diagram illustrating an adaptive binaural beamforming, according to an embodiment.

To allow an adaptation of the binaural beamformer towards the current acoustics scene, additional adaptive processing may be possible. By forming a so-called target blocking beam, a kind of a noise reference signal $z_{\_N}(\omega)$ can be created by the equation:

$$z_{\_N}(\omega) = w_{\_N}(\omega) y_{\_B}(\omega),$$

where $w_{\_N}(\omega)$ are the beamformer coefficients of the target blocking beamformer. In this binaural configuration, the pattern would look like the one illustrated in FIG. 8, for example. This signal can be adaptively subtracted from the binaural target beam $z_{\_B}(\omega)$ using an adaptive noise canceller:

$$z_{\_AB}(\omega) = z_{\_B}(\omega) - w_{\_AB}(\omega) z_{\_N}(\omega),$$

where the weights of the noise canceller $w_{\_AB}(\omega)$ can be adaptively updated by using a Least-Mean-Squares (LMS) approach, for example. This approach is illustrated in FIG. 14, for example.

The adaptive processing can, or may have to, be disabled in conditions where only one audio stream is received (with sufficient quality) by setting the adaptive weights $w_{-AB}(\omega)$ to 0.

Other signal processing schemes or algorithms can be considered as alternatives to the binaural beamforming algorithm.

In the embodiment illustrated in FIG. 11B, for example, the audio transmission methods may utilize a blind source separation (BSS) algorithm or other alternatives to the binaural beamformer algorithm. A blind source separation (BSS) algorithm is described in European patent publication EP 1017253 B1 and a binaural beamformer algorithm is described in U.S. Pat. Nos. 5,651,071; 5,511,128; European patent EP 0 855 130 B1; and German patent DE 43 27 901 C1, for example, the entire contents of which are incorporated herein by reference. For example, with respect to blind source separation (BSS), as described in EP 1017253 B1, for example, an input signal having multiple components, such as multiple voices or mixtures of voice and noise signals from unknown sources, is analyzed for a signal transformation related to statistical dependence between its components to separate and recover the desired individual source signals from the mixture.

Figure 15:
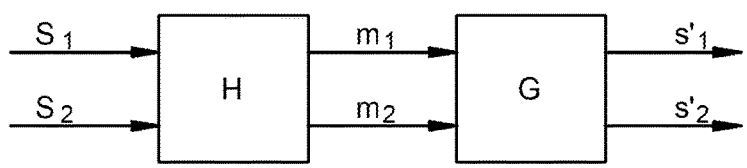
FIG. 15 is a schematic diagram illustrating a principle of blind source separation (BSS), according to an embodiment.

The embodiment illustrated in FIG. 11B can improve the signal-to-noise ratio using a blind source separation (BSS) algorithm. In particular, when receiving the left and right microphone signals, a blind source separation (BSS) algorithm can be applied to separate the voice from the noise. The basic principle of the BSS is shown in FIG. 15, for example.

Considering that both microphone signals (m1 and m2) contain voice (s1) and noise (s2):

$m_1 = h_{11}s_1 + h_{12}s_2$ $m_2 = h_{21}s_1 + h_{22}s_2$ $M = H \cdot S,$ the goal is to find a system (G) that separates the two microphone signals (M) in order to estimate the original sources (S') and extract $s'_1$:

$s'_1 = g_{11}m_1 + g_{12}m_2$ $s' = g_{21}m_1 + g_{22}m_2$ $S' = G \cdot M$

The decision whether to use one or the other solution (binaural beamforming algorithm or BSS) may depend on platform limitations in terms of hardware and software, performance of the algorithms, and power consumption.

In the embodiment illustrated in FIG. 11C, the audio transmission methods may utilize audio diversity. Audio diversity is described in US patent publication 2015/0326984 A1 and International publication WO 2008089784 A1, for example, the entire contents of which are incorporated herein by reference. Specifically, as described in US patent publication 2015/0326984 A1, for example, multipath fading can be mitigated by utilizing redundant wireless sources of the streaming data (i.e., multiple copies of the streaming information may be sent to the hearing assistance devices) and selecting the signal with the better quality metrics, such as a Received Signal Strength Indicator (RSSI), a Signal to Noise ratio (SiNR), a measure of how many decoding errors of the streaming audio have occurred recently, a data rate (typically the lower the signal quality the lower the data rate that may be sent), a jitter rate, or the like.

The solution illustrated in FIG. 11C can include selecting the best audio pickup side depending on the environmental conditions. For example, if there is wind noise on one side, the other side can provide a better signal-to-noise ratio.

When receiving audio signals from the two hearing devices worn by another user, an alternative to exploiting both sources may be to select the one with the best quality or in general the most optimal one.

The reasons for having a different audio quality in both signals or hearing devices are numerous and can be due, for example, to wind noise or to a significantly louder noise source on one side because of the presence of an open window or of a noisy device like a fan or a loudspeaker, for example.

The source selection can be based on a quality metric, such as SNR (signal-to-noise ratio), for example. The SNR can be computed either at the source, i.e., both hearing devices worn by another user, and transmitted regularly alongside the audio signals, or directly in the receiving end. The former option can lower the complexity at the receiving end and can benefit from additional cues to achieve a robust estimation, but implies that the system can handle metadata in parallel with audio. The second option can mean that no metadata transmission may be necessary in order for the two audio signals to be received and analyzed.

Finally, the metadata could contain explicit SNR values or directly an indication of which audio signal is the most optimal at a specific time. The benefit of this solution compared to the computing of the SNR, as described above, can be that it may be simpler in terms of complexity and power consumption. This solution may also avoid potential extra audio delay due to the signal processing.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be desirable to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. An audio transmission method between at least two audio communication systems including a transmitting audio communication system and a receiving audio communication system, wherein the transmitting audio communication system comprises a first audio transmitting device and a second audio transmitting device, and the receiving audio communication system comprises at least one audio receiving device, the method comprising:

transmitting a first wireless audio stream, via a first wireless audio link, by the first audio transmitting device and a second wireless audio stream, via a second wireless audio link, by the second audio transmitting device; and selecting, by the at least one audio receiving device, one of the first wireless audio stream or the second wireless audio stream based on quality parameters of the first wireless audio link and/or the second wireless audio link, wherein at least one of the first wireless audio stream or the second wireless audio stream contains a voice of a first user of the first audio transmitting device and the second audio transmitting device, said voice being captured by at least one microphone of the first audio transmitting device and the second audio transmitting device.

2. The audio transmission method according to claim 1, wherein at least one of the first audio transmitting device or the second audio transmitting device is configured to be worn by the first user, and wherein the at least one audio receiving device is configured to be worn by a second user.

3. The audio transmission method according to claim 1, wherein each audio data packet of the first wireless audio stream and the second wireless audio stream is transmitted in a separate time slot of a Time Division Multiple Access (TDMA) frame.

4. The audio transmission method according to claim 1, wherein the selecting, by the at least one audio receiving device, one of the first wireless audio stream or the second wireless audio stream, comprises selecting the first wireless audio stream when a quality parameter of the first wireless audio link is above a pre-defined quality threshold or better than a quality parameter of the second wireless audio link.

5. The audio transmission method according to claim 1, wherein the selecting, by the at least one audio receiving device, one of the first wireless audio stream or the second wireless audio stream, comprises selecting the second wireless audio stream when a quality parameter of the second wireless audio link is above a pre-defined quality threshold or better than a quality parameter of the first wireless audio link.

6. The audio transmission method according to claim 1, wherein the quality parameter of the first wireless audio link and the quality parameter of the second wireless audio link are link quality parameters comprising audio received signal strength, audio signal strength to noise ratio, or packet error rate.

7. The audio transmission method according to claim 1, wherein the quality parameter of the first wireless audio link and the quality parameter of the second wireless audio link are audio quality parameters comprising signal to noise ratio.

8. The audio transmission method according to claim 1, wherein the first wireless audio stream and the second wireless audio stream are both transmitted as audio data packets, and wherein a transmission of at least some of the audio data packets overlaps in time, but not in frequency.

9. An audio transmission method between at least two audio communication systems including a transmitting audio communication system and a receiving audio communication system, wherein the transmitting audio communication system comprises a first audio transmitting device and a second audio transmitting device, and the receiving audio communication system comprises a at least one audio receiving device, the method comprising:

transmitting a first wireless audio stream, via a first wireless audio link, by the first audio transmitting device and a second wireless audio stream, via a second wireless audio link, by the second audio transmitting device;

selecting, by the at least one audio receiving device, one of the first wireless audio stream or the second wireless audio stream based on quality parameters of the first wireless audio link and/or the second wireless audio link; and when the at least one audio receiving device selects both the first wireless audio stream and the second wireless audio stream, applying a signal processing algorithm exploiting both the first wireless audio stream and the second wireless audio stream, the signal processing algorithm improving a signal to noise ratio of an own voice pickup signal, wherein at least one of the first wireless audio stream or the second wireless audio stream contains a voice of a first user of the first audio transmitting device and the second audio transmitting device, said voice being captured by at least one microphone of the first audio transmitting device and the second audio transmitting device.

10. The audio transmission method according to claim 9, wherein at least one of the first audio transmitting device or the second audio transmitting device is configured to be worn by the first user, and wherein the at least one audio receiving device is configured to be worn by a second user.

11. The audio transmission method according to claim 9, wherein the selecting, by the at least one audio receiving device, one of the first wireless audio stream or the second wireless audio stream, comprises selecting the first wireless audio stream when a quality parameter of the first wireless audio link is above a pre-defined quality threshold or better than a quality parameter of the second wireless audio link.

12. The audio transmission method according to claim 9, wherein the selecting, by the at least one audio receiving device, one of the first wireless audio stream or the second wireless audio stream, comprises selecting the second wireless audio stream when a quality parameter of the second wireless audio link is above a pre-defined quality threshold or better than a quality parameter of the first wireless audio link.

13. The audio transmission method according to claim 9, wherein the quality parameter of the first wireless audio link and the quality parameter of the second wireless audio link are link quality parameters comprising audio received signal strength, audio signal strength to noise ratio, or packet error rate.

14. The audio transmission method according to claim 9, wherein the quality parameter of the first wireless audio link and the quality parameter of the second wireless audio link are audio quality parameters comprising signal to noise ratio.

15. The audio transmission method according to claim 9, wherein the signal processing algorithm is a binaural beamforming algorithm or a blind source separation algorithm.

16. The audio transmission method according to claim 15, wherein the binaural beamforming algorithm is performed at the receiving audio communication system.

17. The audio transmission method according to claim 9, wherein the first wireless audio stream and the second wireless audio stream are both transmitted as audio data packets, and wherein a transmission of at least some of the audio data packets does not overlap in time.

18. An audio communication network comprising:
a first audio communication system including a first audio transmitting device and a second audio transmitting device, and
a second audio communication system including at least one audio receiving device, wherein:
the first audio transmitting device and the second audio transmitting device are configured to transmit a first wireless audio stream, via a first wireless audio link, and a second wireless audio stream, via a second wireless audio link, respectively; and the at least one audio receiving device is configured to select one of the first wireless audio stream or the second wireless audio stream based on quality parameters of the first wireless audio link and/or the second wireless audio link, wherein at least one of the first wireless audio stream or the second wireless audio stream contains a voice of a first user of the first audio transmitting device and the second audio transmitting device, said voice being captured by at least one microphone of the first audio transmitting device and the second audio transmitting device.

19. The audio communication network according to claim 18, wherein the first audio transmitting device and the second audio transmitting device are configured to be respectively worn at one of each ear of the first user.

20. The audio communication network according to claim 18, wherein the at least one audio receiving device is configured to be worn by a second user.

21. The audio communication network according to claim 18, wherein each audio data packet of the first wireless audio stream and the second wireless audio stream is transmitted in a separate time slot of a Time Division Multiple Access (TDMA) frame.

22. An audio transmission method between at least two audio communication systems including a transmitting audio communication system and a receiving audio communication system, wherein the transmitting audio communication system comprises a first audio transmitting device and a second audio transmitting device, and the receiving audio communication system comprises at least one audio receiving device, the method comprising:

transmitting a first wireless audio stream, via a first wireless audio link, by the first audio transmitting device and a second wireless audio stream, via a second wireless audio link, by the second audio transmitting device; and receiving, at the at least one audio receiving device both the first wireless audio stream and the second wireless audio stream, and applying a signal processing algorithm exploiting both the first wireless audio stream and the second wireless audio stream, the signal processing algorithm improving a signal to noise ratio of an own voice pickup signal, wherein at least one of the first wireless audio stream or the second wireless audio stream contains a voice of a first user of the first audio transmitting device and the second audio transmitting device, said voice being captured by at least one microphone of the first audio transmitting device and the second audio transmitting device.

23. The audio communication network according to claim 22, wherein each audio data packet of the first wireless audio stream and the second wireless audio stream is transmitted in a separate time slot of a Time Division Multiple Access (TDMA) frame.

* * * * *